Patented July 22, 1924.

1,502,285

UNITED STATES PATENT OFFICE.

NORMAN R. WILSON, OF BELLEVILLE, NEW JERSEY, ASSIGNOR TO DAVID A. SHIRK, OF GLEN RIDGE, NEW JERSEY.

METHOD OF PRECIPITATING AN INSOLUBLE SULPHIDE FROM A SOLUBLE SULPHOSALT.

No Drawing.   Application filed July 19, 1921. Serial No. 485,922.

*To all whom it may concern:*

Be it known that I, NORMAN R. WILSON, a citizen of the United States, and resident of Belleville, in the county of Essex and State of New Jersey, have invented a new and useful Improvement in Methods of Precipitating an Insoluble Sulphide from a Soluble Sulphosalt; and I do hereby declare the following to be a full, clear, and exact description thereof.

My invention relates to the formation of chemical precipitates especially insoluble sulphides, and more particularly to that type of reaction in which two or more soluble chemical compounds react to form a third compound which is insoluble, or practically so, in the supernatant liquor.

The object of my invention is to produce precipitates of such a nature that they can be more easily filtered from the supernatant liquor and more easily washed free from the residual acid or salt than by any process heretofore known. It is also my object to produce precipitates which, when dried, may be easily reduced to a powdered state so that they may perform more satisfactorily their useful functions in the arts.

To these and other ends my process consists in dissolving or disintegrating certain chemical solids especially soluble sulphosalts, whether they exist in an anhydrous, amorphous or crystalline state, in an amount of acid or other solution, either concentrated or diluted, which is at least sufficient to decompose the solid and produce the desired precipitate, the solid being gradually dissolved and the precipitate being formed as fast as solution takes place.

An essential feature of my invention is that one of the reacting materials is brought into the reaction in solid form, as distinguished from ordinary methods of precipitation where all of the reacting materials are either originally liquid or are brought into solution before being mixed.

My present invention is the result of investigations directed to improve the preparation of antimony pentasulphide, although the principles which I have discovered and which are herein set forth and claimed are by no means confined to producing this substance, several other useful applications of my process being mentioned below.

Antimony pentasulphide has been prepared by dissolving sodium sulphantimonate in water and mixing with dilute sulphuric acid, which precipitates antimony pentasulphide with liberation of hydrogen sulphide. This process throws down a precipitate which is somewhat gelatinous and is composed of extremely fine particles, and which is therefore difficult to filter and wash. When dried, the precipitated material is a hard mass and can be reduced to the fine powder required in the arts only with considerable difficulty.

I have discovered that if, instead of dissolving the sodium sulphantimonate in water preparatory to precipitation, this salt is mixed in solid form with the sulphuric acid, the resulting precipitate can be readily filtered and washed and, when dried, is friable and easily milled into fine powder. I consider that this remarkable difference between my precipitate and that produced by prior methods is partly due to the rate of solution of the salt in the water present, as well as upon the increase in the rate of reaction between the acid and the salt.

I do not wish to be limited to the theory of reaction herein discussed, but it is my present belief that the novel and surprising results produced by my process are largely due to the relatively small amount of water that is present in contact with the particles of salt when the salt is undergoing reaction. This is indicated by a comparison of the ordinary process of producing antimony pentasulphide by mixing a water solution of sodium sulphantimonate and dilute sulphuric acid, with the reaction that takes place in my present process. The ordinary method, where the acid and salt are both in solution, proceeds according to the following equation:

$$2Na_3SbS_4 + 6H_2SO_4 = Sb_2S_5 + 3H_2S + 6NaHSO_4.$$

Taking an approximately saturated solution of sodium sulphantimonate containing, for example, 23 grams of solid salt to 77 grams of water, and assuming that equivalent weights of the acid and salt are employed, there are about 959 grams of solid sodium sulphantimonate dissolved in 3211 grams of water and containing 320 grams of water of crystallization, giving a total amount of water introduced with the salt of 3535 grams. The theoretical amount of sulphuric acid required to react according to the above equation is 588 grams $H_2SO_4$ which, with 2055 grams of water, gives a solution of approximately 20% Bé. When the two solutions are mixed, the acid immediately becomes much more dilute, and if no precipitation takes place the acid would become only 8.63% acid instead of the original 22.25%. Presumably this state of affairs comes about momentarily. In the same manner the 23% solution of sodium sulphantimonate is change momentarily to a 14.07% solution. The precipitation of the antimony pentasulphide, therefore, takes place in a considerably diluted solution.

In all probability, because of this fairly large dilution, the precipitated antimony pentasulphide drags water down with it, the water being combined with the precipitate either as water of hydration or water combined chemically by hydrolysis. This substance, when dried, gives up its water and its particles, like the particles of other well known highly hydrated materials, such as ferric hydroxide and aluminum hydroxide, pack together and form a cake instead of a fluffy powder.

In contrast to the reaction just discussed, the reaction when solid crystals of sodium sulphantimonate are treated with dilute sulphuric acid, follows this equation:

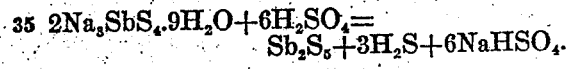
$$2Na_3SbS_4.9H_2O + 6H_2SO_4 = Sb_2S_5 + 3H_2S + 6NaHSO_4.$$

The sodium sulphantimonate carries with it its water of crystallization, but not the 3211 grams of water required to dissolve it, as in the first example. The conditions of precipitation are very different from those in the first example. Probably no reaction takes place until some of the solid is dissolved, and the solution of the solid takes water from the sulphuric acid, thereby concentrating the acid. In all probability all of the precipitation produced from a given crystal of sodium sulphantimonate takes place in the thin layer of concentrated solution immediately around the crystal. In other words, the crystal, after solution has begun, is surrounded by a layer of concentrated sodium sulphantimonate solution and this concentrated solution reacts with the sulphuric acid which, in turn, may be said to be somewhat concentrated since some of its water is used in dissolving the sodium sulphantimonate.

There are several reasons why the precipitate formed in the second example, that is, formed according to my process, should be flaky and in relatively large agglomerates suitable for rapid washing and filtering. First, the particles do not have a chance to become hydrated since they are precipitated in locally concentrated solution. Second, being thus precipitated in locally concentrated solution, the particles as formed are in close contact with each other and they have a chance to build up large agglomerates, this action being somewhat similar to the building up of large agglomerates of ferric hydroxid by digestion in a hot solution. Also, sodium sulphate is formed simultaneously with the precipitation of antimony pentasulphide and in equivalent amounts. Sodium sulphate, as is well known, has a great affinity for water, and this has the double effect of removing water from the reaction zone, thus making the reacting solutions more concentrated, and of giving a "salting out" effect, because of its power to take up the water which would otherwise tend to hydrate the precipitate.

Also, when the reaction is completed the total amount of water present when the sodium sulphantimonate is treated in solid form is less than one-half the water finally present in the ordinary process described in the example first above given.

All of these several effects are additive in a positive direction. That is to say, they all contribute to produce a precipitate that is easily washed and filtered.

Without limiting my invention to the specific proportions and materials mentioned, the following is an example of the preparation of antimony pentasulphide according to my process.

Prepare 200 grams of Schlippe salt, $Na_3SbS_4.9H_2O$ by any of the well known methods. Prepare a sufficient amount of acid to completely decompose the salt. For this example, take 125 grams of concentrated $H_2SO_4$ and dilute to about 20° Bé. When the diluted acid has cooled to the desired temperature add the crystals to it and allow it to react until the evolution of the gas entirely ceases, agitating continuously. Then transfer the material to a suitable filter, wash free from acid, and heat the precipitate in a suitable drier until practically free from moisture.

The agitation is required to prevent the slowing up of the reaction by the formation of a layer of reaction products between the crystals and the acid. The same results are produced by pouring acid upon the solid instead of introducing the crystals into the acid, and this method is satisfactory when treating small amounts of material. However, when my process is carried out on a large scale it is usually more convenient to introduce the crystals into the acid.

The precipitate of antimony pentasulphide produced according to my process differs but little in appearance from the product of the ordinary process where the sodium sulphantimonate is dissolved in water before being mixed with acid. My new product is somewhat less gelatinous than the precipitate of the ordinary process and, after filtering and drying contains a great deal less of the hard gritty particles which interfere with grinding the ordinary precipitate to powder. When my precipitate is filtered and washed a marked difference appears between the two precipitates, the precipitate of my present process being quickly washed without difficulty and being then in a soft friable condition, easily reduced to powder.

The product which I wish to claim as novel is the intermediate product produced by precipitation, filtering and washing in the manner described above and before the material is finished by the usual grinding and bolting operations. Ordinary unbolted antimony pentasulphide contains a considerable quantity of hard gritty particles and is so gelatinous as to be washed with difficulty, whereas the product produced according to my present invention is, as stated above, soft and friable and easily washed and pulverized.

This difference in milling qualities is particularly important since the product is mainly used as a pigment and the color of antimony pentasulphide is greatly impaired if the material is subjected to very much grinding or pounding, which decomposes the sulphide to some extent and causes the material to be filled with black particles.

Variations in this process may be made by using calcium sulphantimonate, $Ca_3(SbS_4)_2$, instead of sodium sulphantimonate, in which case hydrochloric acid is preferably employed as the precipitant instead of sulphuric acid.

As stated above, my process, while of special advantage in the preparation of antimony pentasulphide, is not limited to this use and is of general application within the scope of the appended claims. I have prepared aluminum hydroxide in a non-gelatinous condition by adding crystals of potash alum to ammonium hydroxide. Sulphides of tin and arsenic have also been prepared according to my process by adding crystals of sulpharsenates and sulphostannates to suitable acids, giving fine precipitates that are easily washed and ground. Ferric hydroxide may also be precipitated in non-gelatinous form by the use of this principle.

I find that in carrying out my process an excess of acid has a beneficial effect. In the example given above, 125 grams of sulphuric acid are mentioned, and this amount of acid is about double the amount theoretically required to precipitate antimony pentasulphide from sodium sulphantimonate. A greater or less excess of acid may be used, and I have found that 75 grams of acid in the same example will also give satisfactory results, though the product contains rather more of the undesirable gritty particles than when a larger excess of acid is employed.

The precipitation of antimony pentasulphide by reaction between sodium sulphantimonate and sulphuric acid takes place in one of two ways, either according to the equation given above, where 6 molecules of sulphuric acid react with 2 molecules of sodium sulphantimonate, or according to another reaction where 3 molecules of sulphuric acid will react with 2 molecules of sodium sulphantimonate, and where sodium sulphate is apparently produced instead of sodium bisulphate, as in the above equation. Identical quantities of antimony pentasulphide are precipitated by both of these reactions, and where an excess of acid is referred to herein, this means more acid than is required for precipitating antimony pentasulphide by the reaction last mentioned. The 125 grams of acid mentioned in the foregoing example is therefore an excess of acid as compared with the minimum amount required to precipitate the antimony pentasulphide, although this 125 grams of acid is the chemical equivalent of 200 grams of sodium sulphantimonate according to the reaction where 6 molecules of acid react with 2 molecules of sodium sulphantimonate.

I claim as my invention:

1. The process that comprises treating a solid water-soluble sulphosalt with an acid capable of decomposing the said salt and precipitating a sulphide therefrom.

2. The process that comprises introducing crystals of a water-soluble sulphosalt into an acid capable of decomposing the said salt and precipitating a sulphide therefrom.

3. The process that comprises treating a solid water-soluble sulphosalt with an acid capable of decomposing the said salt and precipitating a sulphide therefrom, the acid being present in excess of the amount required for precipitating the said sulphide.

4. The process of preparing antimony pentasulphide that comprises treating a solid sulphantimonate with a mineral acid capable of decomposing said salt and precipitating antimony pentasulphide therefrom.

5. The process of preparing antimony pentasulphide that comprises treating with sulphuric acid a solid sulphantimonate capable of reacting with sulphuric acid to precipitate antimony pentasulphide.

6. The process of preparing antimony pentasulphide that comprises treating solid sodium sulphantimonate with a mineral acid.

7. The process of preparing antimony pentasulphide that comprises treating solid sodium sulphantimonate with sulphuric acid.

8. The process of preparing antimony pentasulphide that comprises introducing solid crystalline sodium sulphantimonate into dilute sulphuric acid.

9. The process of preparing antimony pentasulphide that comprises mixing crystals of sodium sulphantimonate with sulphuric acid, the acid being present in excess of the amount required for precipitating the said sulphide.

10. The process of preparing antimony pentasulphide that comprises treating a solid sulphantimonate with sulphuric acid and filtering, washing and drying the resulting precipitate.

11. The process of preparing antimony pentasulphide that comprises introducing solid crystalline sodium sulphantimonate into dilute sulphuric acid, and filtering, washing and drying the resulting precipitate.

12. The process of preparing antimony pentasulphide that comprises diluting about 125 parts by weight of concentrated sulphuric acid to about 20° Bé., mixing the diluted acid with about 200 parts by weight of crystalline sodium sulphantimonate, allowing the material to react, with agitation, until the evolution of gas ceases, and filtering, washing and drying the resulting precipitate.

13. As a new article of manufacture, unground antimony pentasulphide in soft friable form, and capable of being readily washed, dried and ground to fine powder.

14. As a new article of manufacture, unground antimony pentasulphide precipitated in the form of soft, friable agglomerates.

15. As a new article of manufacture, unground antimony pentasulphide precipitated in the form of soft masses which are readily washed, dried and ground.

In testimony whereof, I the said NORMAN R. WILSON, have hereunto set my hand.

NORMAN R. WILSON.

Witnesses:
C. P. LEACH,
H. L. WILLIAMSON.